United States Patent
Mindel et al.

(10) Patent No.: US 10,176,697 B2
(45) Date of Patent: Jan. 8, 2019

(54) IMPACT HANDLING AND ULTRASOUND ALERTING METHODS

(71) Applicant: MOBIUS PROTECTION SYSTEMS LTD., Holon (IL)

(72) Inventors: Shy Mindel, Hod Hasharon (IL); Anan Hasan, Julis (IL)

(73) Assignee: MOBIUS PROTECTION SYSTEMS LTD., Holon (IL)

( * ) Notice: Subject to any disclaimer, the term of this patent is extended or adjusted under 35 U.S.C. 154(b) by 0 days.

(21) Appl. No.: 15/319,821

(22) PCT Filed: Jun. 15, 2015

(86) PCT No.: PCT/IL2015/050602
§ 371 (c)(1),
(2) Date: Dec. 19, 2016

(87) PCT Pub. No.: WO2015/193884
PCT Pub. Date: Dec. 23, 2015

(65) Prior Publication Data
US 2017/0140634 A1 May 18, 2017

Related U.S. Application Data

(60) Provisional application No. 62/013,016, filed on Jun. 17, 2014, provisional application No. 62/028,368, (Continued)

(51) Int. Cl.
*G08B 21/24* (2006.01)
*B60N 2/28* (2006.01)
(Continued)

(52) U.S. Cl.
CPC .............. *G08B 21/24* (2013.01); *B60N 2/28* (2013.01); *B60N 2/2863* (2013.01);
(Continued)

(58) Field of Classification Search
CPC ........ G08B 21/24; G08B 21/02; G08B 21/22; B60N 2/28; B60N 2/2884; B60N 2/2863; B60N 2/2887
See application file for complete search history.

(56) References Cited

U.S. PATENT DOCUMENTS 5,442,343 A * 8/1995 Cato ................. G06F 3/147
340/10.52
2003/0062996 A1* 4/2003 Flanagan ............. B60R 99/00
340/457
(Continued)

FOREIGN PATENT DOCUMENTS

WO    WO-2006/113734    10/2006
WO    WO 2013/046200    4/2013

OTHER PUBLICATIONS

International Search Report of PCT Application No. PCT/IL2015/050602, dated Nov. 17, 2015.
(Continued)

*Primary Examiner* — Nay Tun
(74) *Attorney, Agent, or Firm* — Pearl Cohen Zedek Latzer Baratz LLP

(57) ABSTRACT

Systems and methods of impact handling and ultrasound alerting are provided. Systems comprise an ultrasound transmitter is configured to transmit ultrasound signals at specified frequencies, a controller associated with a vehicle seat and configured to generate the ultrasound signals with respect to seat statuses and control the transmitter accordingly, and an application installable on a user's communication device to be associated with a device's audio receiver. The seat may comprise a dynamic part mounted on a static part and energy absorbing element(s) configured to restrain a movement of the dynamic part relative to the static part upon impact, via connection(s) between the static and dynamic parts that have static element(s) attached to the static part and dynamic element(s) attached to the dynamic part.

15 Claims, 15 Drawing Sheets

Related U.S. Application Data filed on Jul. 24, 2014, provisional application No. 62/067,472, filed on Oct. 23, 2014.

(51) Int. Cl.
 G08B 21/22 (2006.01)
 G08B 21/02 (2006.01)

(52) U.S. Cl.
 CPC ......... B60N 2/2884 (2013.01); B60N 2/2887 (2013.01); G08B 21/02 (2013.01); G08B 21/22 (2013.01)

(56) References Cited

U.S. PATENT DOCUMENTS

| | | |
|---|---|---|
| 2003/0122662 A1 | 7/2003 | Quinonez |
| 2005/0030188 A1* | 2/2005 | Flanagan ................ B60R 99/00 340/667 |
| 2005/0192727 A1 | 9/2005 | Shostak et al. |
| 2006/0208169 A1 | 9/2006 | Breed et al. |
| 2007/0085697 A1 | 4/2007 | Breed |
| 2008/0073141 A1* | 3/2008 | Jaunarena-Ferrari .... B60Q 9/00 180/268 |
| 2008/0157940 A1 | 7/2008 | Breed et al. |
| 2008/0189053 A1 | 8/2008 | Breed et al. |
| 2011/0095940 A1 | 4/2011 | Breed |
| 2012/0089299 A1 | 4/2012 | Breed |
| 2013/0033373 A1 | 2/2013 | Thomas |
| 2013/0038446 A1* | 2/2013 | Huseth ................. G08B 29/183 340/539.13 |
| 2013/0049955 A1 | 2/2013 | Hoover et al. |
| 2013/0201013 A1* | 8/2013 | Schoenberg ............ B60R 22/48 340/438 |

OTHER PUBLICATIONS

European Search Report of EP Application No. 15 80 9030 dated Feb. 7, 2018.

\* cited by examiner

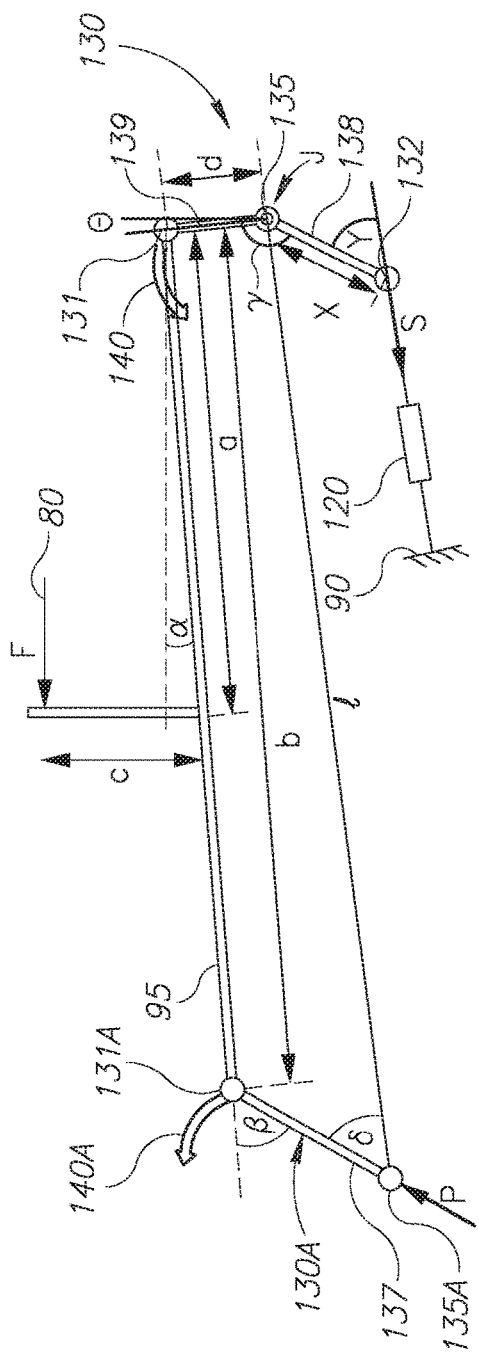
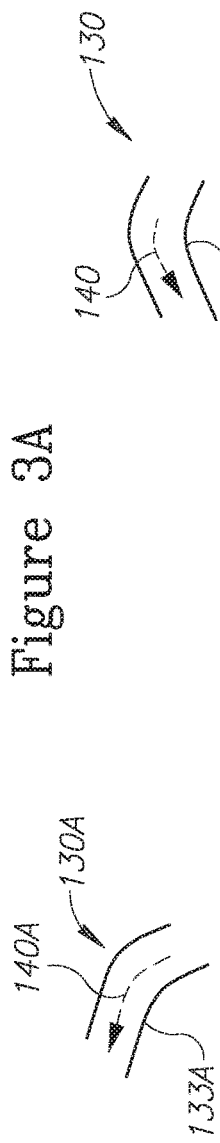
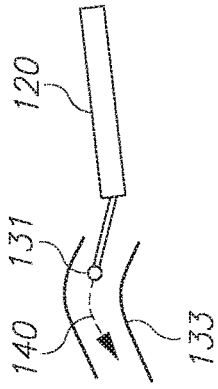
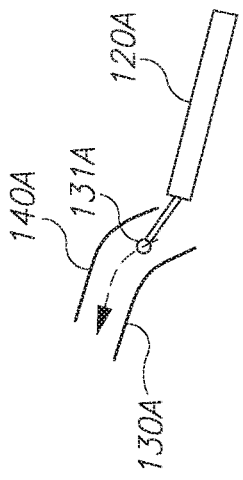
Figure 3A
Figure 3B
Figure 3C

```
200
 │
 ▼
```

- 240 — CONFIGURING THE STATIC ELEMENT(S) TO CONTROL A TRAJECTORY OF THE DYNAMIC ELEMENT(S) IN A WAY THAT CONVERTS AT LEAST A PART OF A HORIZONTAL COMPONENT OF THE IMPACT INTO A VERTICAL FORCE COMPONENT APPLIED TO THE DYNAMIC PART

- 245 — CONTROLLING THE SEAT'S TRAJECTORY TO MAKE THE SITTING POSTURE MORE UPRIGHT UPON IMPACT

- 247 — TILTING THE SEAT UPON IMPACT TO A LARGER ANGLE FROM THE HORIZONTAL

- 250 — CONFIGURING THE STATIC ELEMENT(S) AS TRACK(S) SHAPED TO DETERMINE THE TRAJECTORY OF THE DYNAMIC ELEMENT(S)

- 255 — CONFIGURING THE TRACK(S) AND/OR THE ENERGY ABSORBING ELEMENT(S) TO AT LEAST PARTIALLY CARRY OUT THE FORCE CONVERSION

- 260 — CONFIGURING THE DYNAMIC ELEMENT(S) AS PIVOTED CAM(S)

Figure 6 (cont. 1)

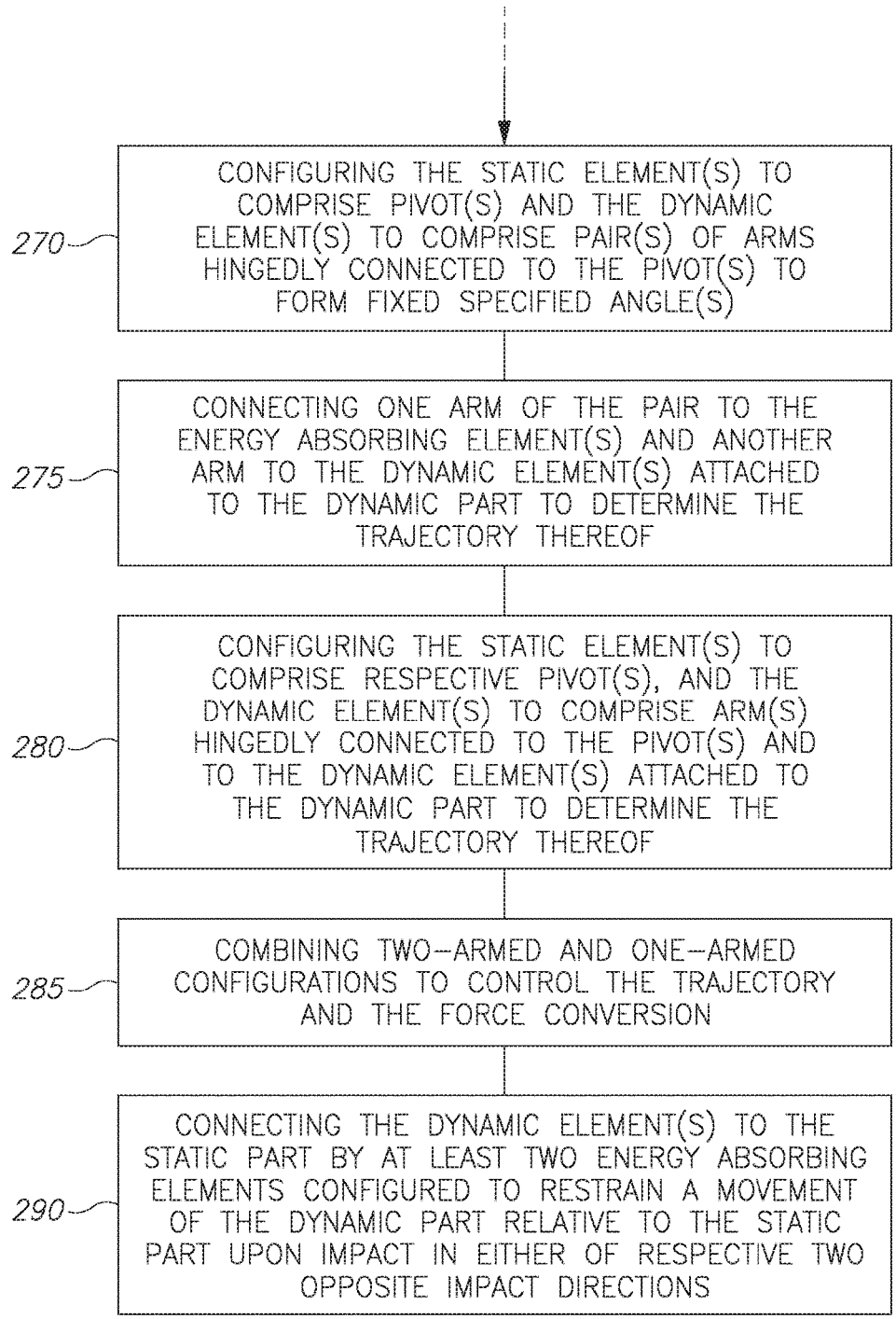
Figure 6 (cont. 2)

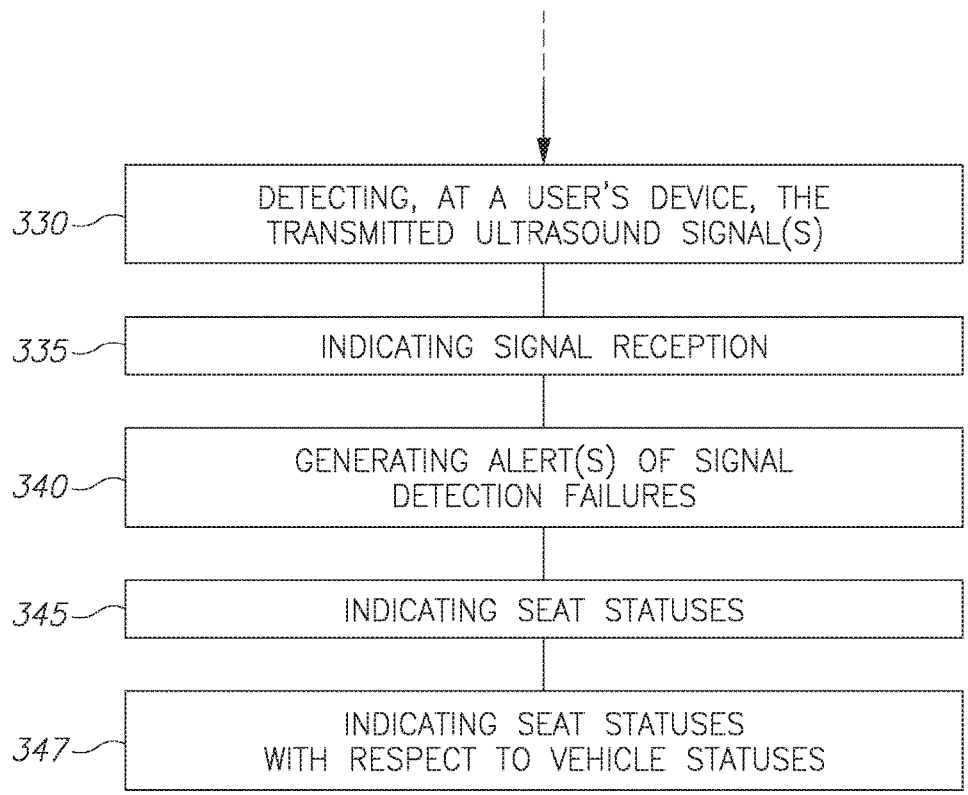
Figure 9 (cont. 1)

IMPACT HANDLING AND ULTRASOUND ALERTING METHODS

CROSS-REFERENCE TO RELATED APPLICATIONS

This application is a National Phase Application of PCT International Application No. PCT/IL2015/050602, International Filing Date Jun. 15, 2015, entitled: "IMPACT HANDLING AND ULTRASOUND ALERTING METHODS", published on Dec. 23, 2015 as International Patent Application Publication No. WO 2015/193884, claiming priority of U.S. Provisional Patent Application No. 62/013,016, filed Jun. 17, 2014, U.S. Provisional Patent Application No. 62/028,368, filed Jul. 24, 2014 and U.S. Provisional Patent Application No. 62/067,472 filed Oct. 23, 2014, which are hereby incorporated by reference in their entireties.

BACKGROUND OF THE INVENTION

1. Technical Field

The present invention relates to the field of safety devices, and more particularly, to energy absorbing, impact handling systems associated with ultrasound-based children safety alerts.

2. Discussion of Related Art

Impact energy is often harming and destructive. A special case is a seat system in a vehicle, onto which impacts due to accidents may prove life threatening.

Proper use of vehicle seats, especially baby seats, as well as the need for assuring babies are not forgotten in vehicles are two major issues in vehicle-related children safety requirements. Known systems utilize communication channels such as cellular, WiFi and Bluetooth to communicate with a user's smartphone. For example, U.S. Patent Publication No. 2013049955, which is incorporated herein by reference in its entirety, discloses an approach for providing notifications to caregivers based on the detected presence of a child in a car seat is described. Physical presence of an object within a car seat is detected. A determination is made that a proximity threshold between a mobile device and the car seat is satisfied based on the presence information, range information associated with the mobile device, or a combination thereof. A notification message is generated in response to the detected physical presence of the object to indicate the presence of the object in the car seat based on the determination. Initiation of the transmission of the notification message to a mobile device within a predetermined proximity of the car seat is performed.

SUMMARY OF THE INVENTION

One aspect of the present invention provides an alerting system comprising a transmitter configured to transmit at least one ultrasound or near-ultrasound signal at at least one specified frequency, and an audio receiver configured to receive the at least one ultrasound or near-ultrasound signal and provide an indication of the signal reception.

One aspect of the present invention provides an impact handling system comprising a dynamic part mounted on a static part and at least one energy absorbing element configured to restrain a movement of the dynamic part relative to the static part upon impact, wherein: the system further comprises at least one connection between the static and dynamic parts, the at least one connection having at least one static element attached to the static part and at least one dynamic element attached to the dynamic part, the at least one energy absorbing element is connecting the static part to the at least one dynamic element, and the at least one static element is configured to restrain a movement of the dynamic part relative to the static part upon impact in opposite impact directions and/or to control a trajectory of the at least one dynamic element in a way that converts at least a part of a horizontal component of the impact into a vertical force component applied to the dynamic part.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIGS. 3A-3C are high level illustrations of force calculations and principles of spatial configuration applicable to impact handling system, according to some embodiments of the invention.

DETAILED DESCRIPTION OF THE INVENTION

Figure 1A:
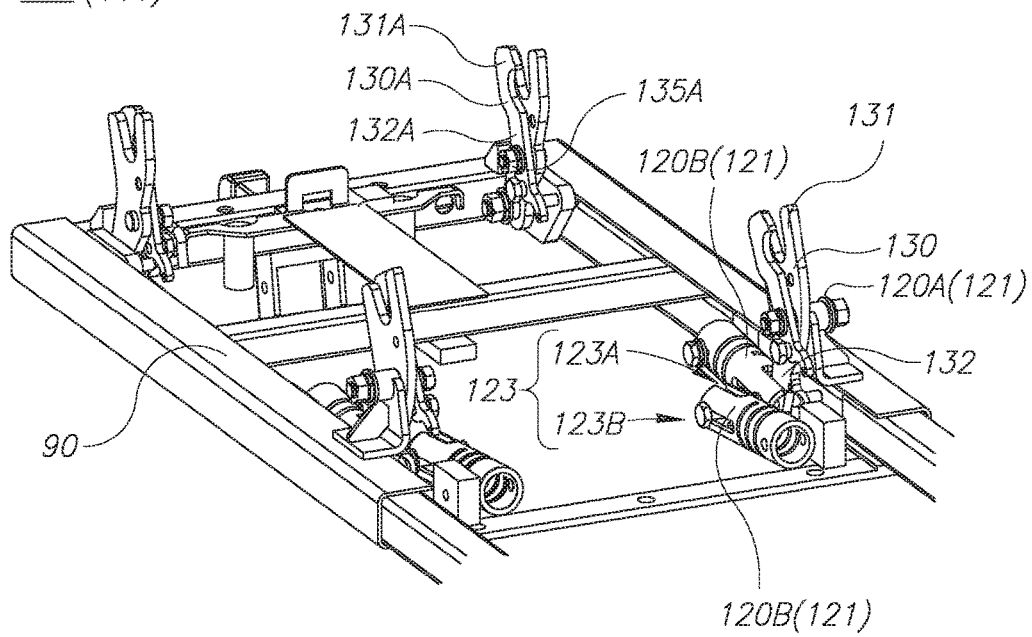
FIGS. 1A-1E and 2A-2E are high level schematic illustrations of an impact handling system, according to some embodiments of the invention.

Prior to the detailed description being set forth, it may be helpful to set forth definitions of certain terms that will be used hereinafter.

The term "dynamic" as used in this application with respect to parts or elements refers to their ability to move in a controlled manner upon impact.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before at least one embodiment of the invention is explained in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Impact handling systems and respective methods are provided, which comprise a dynamic part mounted on a static part and energy absorbing element(s) configured to restrain a movement of the dynamic part relative to the static part upon impact. The system further comprises connection(s) between the static and dynamic parts which have static element(s) attached to the static part and dynamic element(s) attached to the dynamic part. The energy absorbing element(s) is connecting the static part to the dynamic element(s), and the static element(s) is configured to restrain a movement of the dynamic part relative to the static part upon impact in opposite impact directions and/or to control a trajectory of the dynamic element(s) in a way that converts at least a part of a horizontal component of the impact into a vertical force component applied to the dynamic part.

FIGS. 1A-1E and 2A-2E are high level schematic illustrations of an impact handling system 100, according to some embodiments of the invention. FIGS. 3A-3C are high level illustrations of force calculations and principles of spatial configuration applicable to impact handling system 100, according to some embodiments of the invention. FIGS. 3A-3C demonstrate in a non-limiting manner various embodiments and configuration principles for impact handling system 100, while FIGS. 1A-1E and 2A-2E exemplify concrete yet non-limiting examples for implementations of some embodiments of these principles.

Impact handling system 100 comprises a dynamic part 95 (such as a seat) mounted on a static part 90 (such as a basis) and at least one energy absorbing element 120 configured to restrain a movement of dynamic part 95 relative to static part 90 upon impact 80 (see FIG. 3A). System 100 further comprises at least one connection 130 between static and dynamic parts 90, 95 (respectively). Connection(s) 130 (and 130A) has static element(s) 135 attached to static part 90 and dynamic element(s) 131 (and 132) attached to dynamic part 95. Energy absorbing element(s) 120 (120A, 120B) is connecting static part 90 to dynamic element(s) 131 (and/or 132), possibly, using movable connections 123, e.g., connections 123A, 123B movably connecting energy absorbing element(s) 120 (120A, 120B) to dynamic element(s) 132 by means of guiding tracks, as a non-limiting example. Static element(s) 135 may be configured, in certain non-limiting embodiments, to control a trajectory 140 (and 140A, see FIGS. 3A-3C) of dynamic element(s) 131 in a way that converts at least a part of a horizontal component of the impact into a vertical force component applied to dynamic part 95 (see FIG. 3A).

Figure 1B:
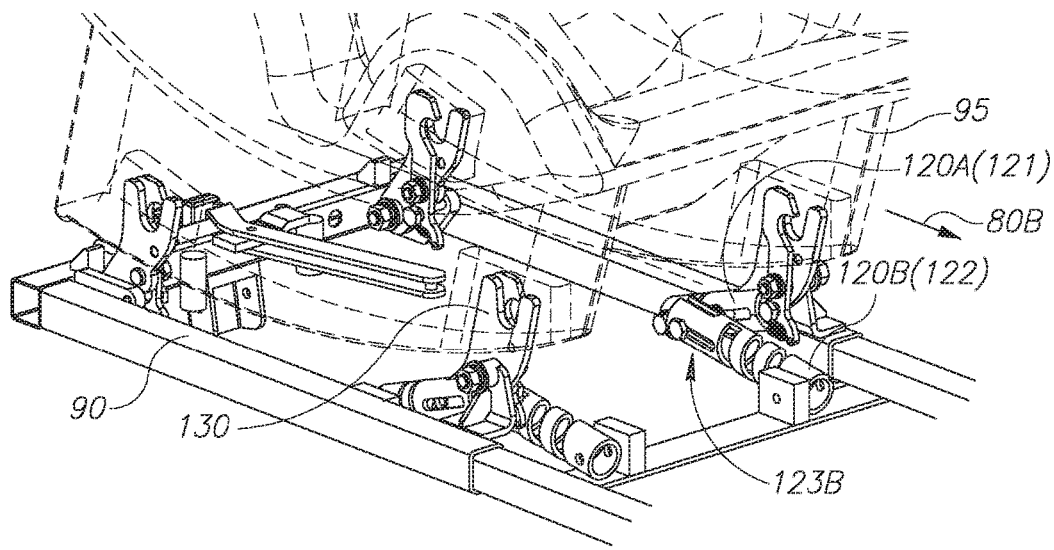

For example, FIGS. 1A and 1B schematically illustrate impact handling system 100 having two sets of connections 130, 130A. Connections 130A comprise static element(s) 135A, comprising respective pivot(s) 135A, and dynamic element(s) 131A (and 132A), hingedly connected to pivot(s) 135A and attached to dynamic part 95. Connections 130 comprise static element(s) 135, comprising at least one pivot 135, and dynamic element(s) 131 (and 132), hingedly connected to pivot(s) 135 and to energy absorbing elements 120A, 120B, which are connected to static part 90. In the embodiments illustrated in FIGS. 1A and 1B, energy absorbing elements 120A, 120B are configured to restrain a movement of dynamic part 95 relative to static part 90 upon impact in either of respective two opposite impact directions. Connections 130, 130A determine the trajectory of dynamic part 95 upon impact in either direction. As an illustration, FIGS. 1A and 1B schematically depict basis 110 (e.g., basis 110 for seat 95) of impact handling system 100 before and after impact, as states 111 and 112 respectively, with energy absorbing elements 120A, 120B in non-extended states 121 and energy absorbing element 120B in extended state 122 upon absorbing rear impact 80B.

Figure 1C:
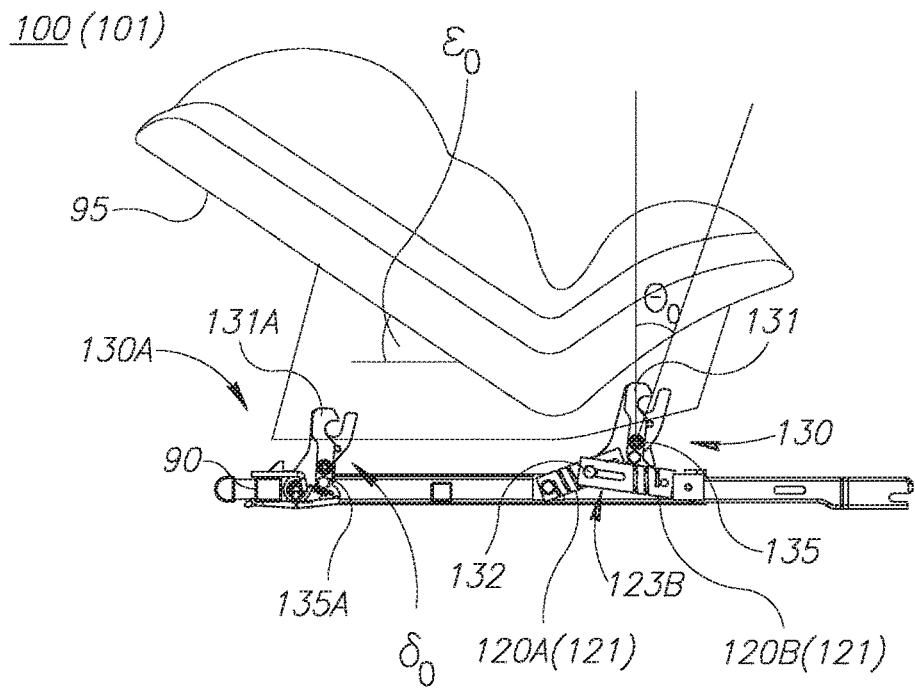
Figure 1D:
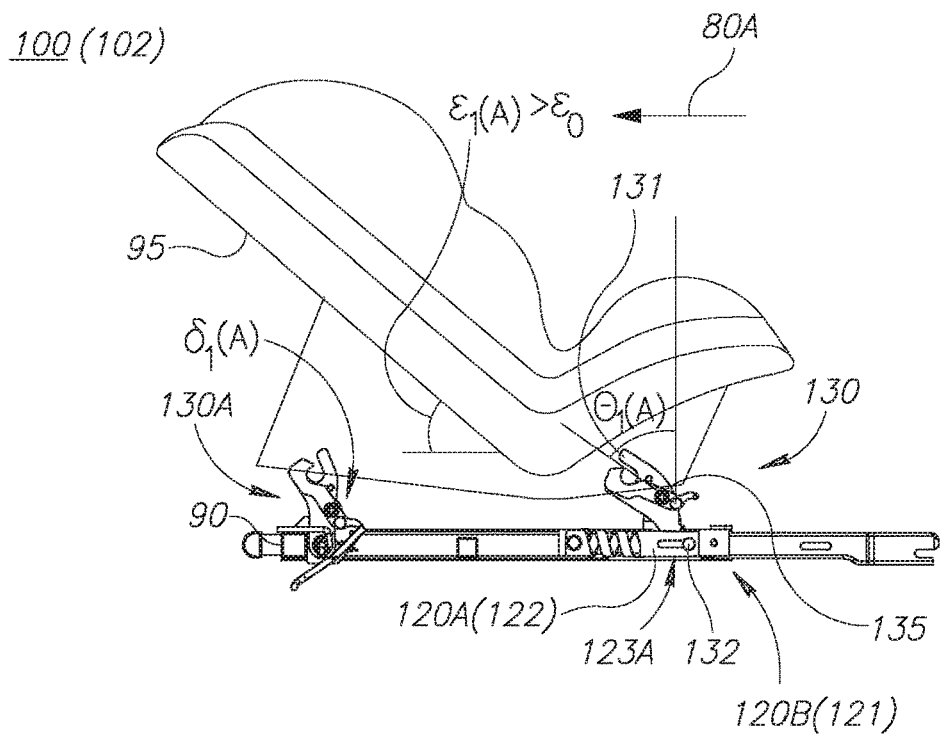
Figure 1E:
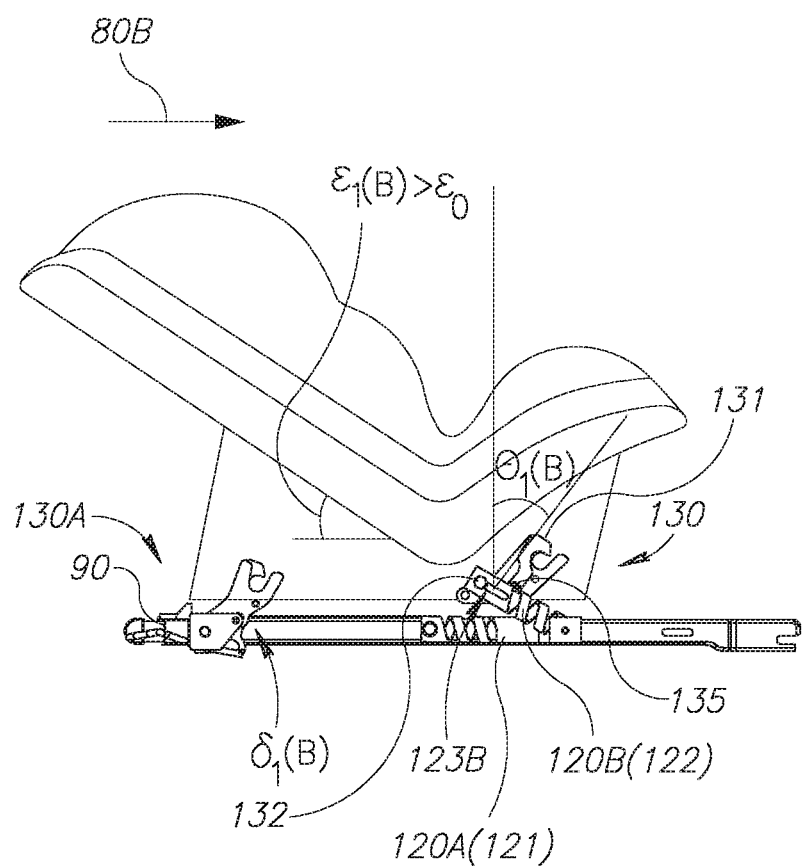

FIGS. 1C-1E schematically illustrate impact handling system 100 at normal (no-impact) state 101 (FIG. 1C) and at impacted states 102A, 102B, namely under frontal impact 80A (FIG. 1D) and under impact 80B from the rear (FIG. 1E, also FIG. 1B). Under both impacts, connections 130 and 130A move to control the trajectory of dynamic element 131 and dynamic part 95 in a way that, in addition to restraining the movement of dynamic part 95 relative to static part 90, also converts at least a part of a horizontal component of impacts 80A or 80B, respectively, into a vertical force component applied to dynamic part 95 in order to prevent or reduce damage to a person on dynamic part 95 upon the respective impact by redirecting the stress applied upon the person to comply better with the person's anatomical structure and tolerances. For example, changing the person's orientation may reduce compression forces applied to the spine due to the impact and to which the spine is more vulnerable than to tensile forces.

In certain embodiments, restraining the movement as well as redirecting the forces may be utilized to redesign static part 90 and/or dynamic part 95 to improve their energy absorbing capability as well, and/or to reduce their respective weights or design them according to the anticipated force application, as regulated by impact handling system 100.

Trajectory control, illustrated in FIGS. 3A-3C below as well, is evident in FIGS. 1C-1E upon considering the orientations of dynamic part 95 and connections 130, 130A, namely the changes in angle δ between the horizontal and connection 130A, from $\delta_0$ in state 101 to $\delta_1(A)$ and $\delta_1(B)$ in forward and rear impact states 102A, 102B respectively; the changes in angle θ between the vertical and connection 130, from $\theta_0$ in state 101 to $\theta_1(A)$ and $\theta_1(B)$ in forward and rear impact states 102A, 102B respectively; and the resulting changes in the inclination angle ε of dynamic part 95 from $\varepsilon_0$ in state 101 to $\varepsilon_1(A)$ and $\varepsilon_1(B)$ in forward and rear impact states 102A, 102B respectively (the angles are exemplified for certain impact values, and clearly depend thereupon—specific values may be configured according to specified ranges of impact forces). Specifically, in certain embodiments, impact handling system 100 and connections 130, 130A may be configured to exhibit angles $\delta_0$, $\delta_1(A)$, $\delta_1(B)$ and $\theta_0$, $\theta_1(A)$, $\theta_1(B)$ that control ε to increase from $\varepsilon_0$ to $\varepsilon_1(A)$ and $\varepsilon_1(B)$ (i.e., $\varepsilon_0 < \varepsilon_1(A)$, $\varepsilon_1(B)$) upon impact, e.g., from $\varepsilon_0 < 30°$ to $\varepsilon_1(A)$, $\varepsilon_1(B) \geq 40°$.

Figure 2A:
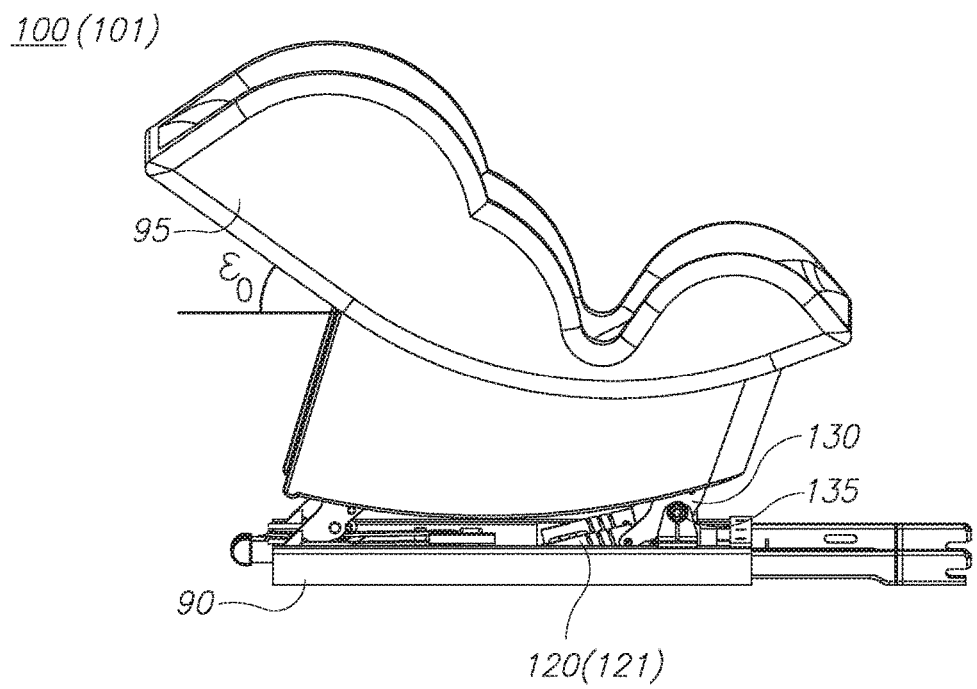
Figure 2B:
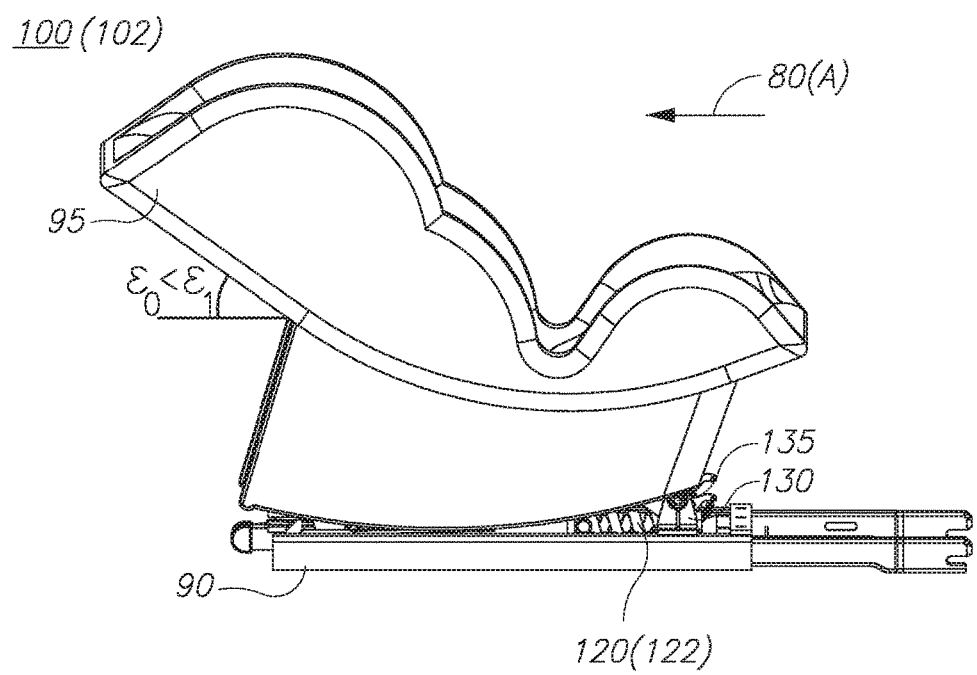

Angles $\delta_0$, $\delta_1(A)$, $\delta_1(B)$ and $\theta_0$, $\theta_1(A)$, $\theta_1(B)$ are determined by the configurations of connections 130, 130A, and specifically by the spatial configuration of the attachment points of static and dynamic elements 135, 131, 132 and of energy absorbing elements 120A, 120B thereto, which may be configured and adapted according to requirements. For example, to yield the illustrated examples, energy absorbing elements 120A, 120B are connected to connection 130 via limiting tracks 123A, 123B respectively which determine the directions and extents of enables movements of the connection points between respective energy absorbing elements 120A, 120B and dynamic elements 132. For example, in the non-limiting illustrated example, the connection of energy absorbing element 120B to dynamic element 132 is designed to rise while energy absorbing element 120B elongates upon energy absorption thereby, upon rear impact 80B (FIG. 1E) and thereby increase inclination angle ε of dynamic part 95. In certain embodiments, illustrated below in FIGS. 2A-2E, the connection of energy absorbing element 120 to dynamic element 132 is designed to sink upon energy absorption by energy absorbing element 120 upon frontal impact 80A (FIGS. 2B, 2E) and thereby increase inclination angle ε of dynamic part 95 from $\varepsilon_0$ to $\varepsilon_1 > \varepsilon_0$ (FIGS. 2A, 2B). In a non-limiting example, $\varepsilon_0$ may be around 25° while $\varepsilon_1$ may reach 40°. The system configuration may be arranged to control the seat's trajectory to make the sitting posture more upright upon impact, e.g., by tilting the seat upon impact to a larger angle from the horizontal.

Figure 2C:
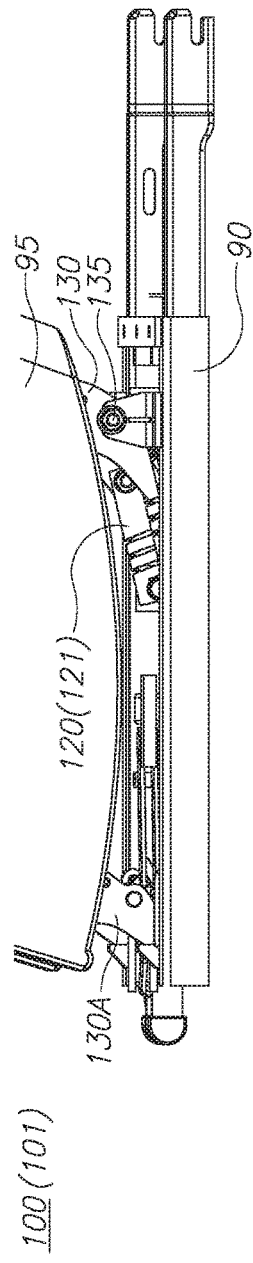
Figure 2D:
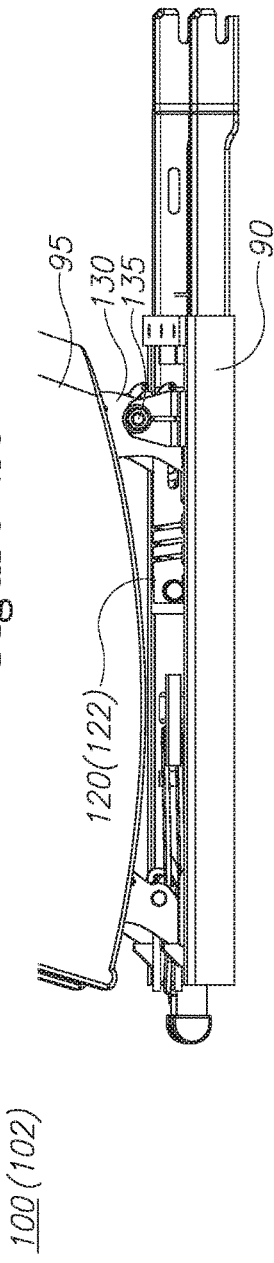
Figure 2E:
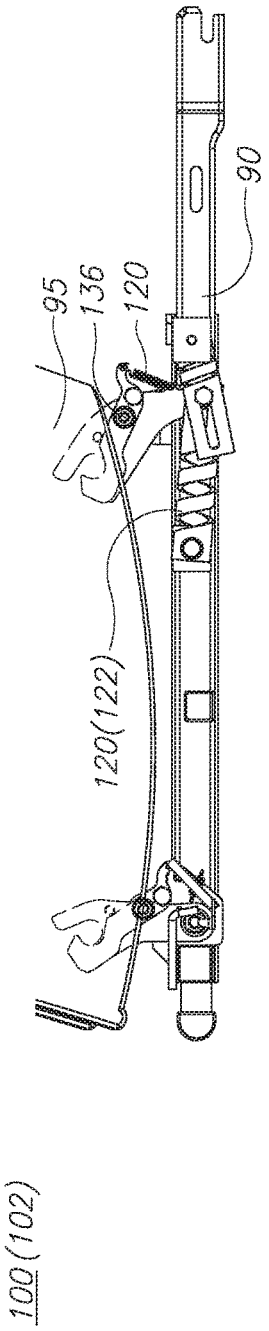

FIGS. 2A-2E schematically illustrate non-limiting embodiments of impact handling system 100 having a single and central energy absorbing element 120, or two lateral energy absorbing elements 120, connecting static part 90 to dynamic element(s) 131 (and/or 132) via connection 130 having arm 136 connecting upper dynamic element 131 connected to dynamic part 95 and lower dynamic element 132 connected to central energy absorbing element 120. FIGS. 2A and 2C illustrate non-impacted state 101, FIGS. 2B, 2E illustrate an impacted state 102 and FIG. 2D illustrates system 100's response to smaller impact 80A and/or to an intermediate state of system 100 upon stronger impact 80A. Such configurations may be realized by other arrangements of one or more energy absorbing elements 120.

Central energy absorbing element 120 plastically extends upon impact 80A (FIGS. 2B, 2E) to absorb energy and restrain the movement of dynamic part 95 relative to static part 90, and is connected to increase inclination angle ε of dynamic part 95 by controlling the trajectory of dynamic element 132 and 131 in a way that converts at least a part of a horizontal component of impact 80A into a vertical force component applied to dynamic part 95.

FIGS. 3A-3C are high level illustrations of force calculations and principles of spatial configuration applicable to impact handling system 100, according to some embodiments of the invention. While one or two energy absorbing elements 120, 120A are illustrated in these figures for explanatory reasons, any configuration of energy absorbing elements 120 that is arranged according to the illustrated principles is considered to be included within the scope of the present disclosure.

FIG. 3A schematically illustrates impact handling system 100 having two sets of connections 130, 130A. In one set of connections (130) static element(s) 135 comprises pivot(s) 135 and dynamic element(s) comprises arms 138, 139 hingedly connected to pivot(s) 135 to form a fixed specified angle λ. Arm 138 is further connected to energy absorbing element(s) 120 and arm 139 is further connected to dynamic element 131 attached to dynamic part 95 and determines trajectory 140 thereof. In certain embodiments, impact handling system 100 further comprises one or more different sets of connections (130A), in which static element 135 comprises respective pivot 135A and dynamic element 131A comprises one arm 137 hingedly connected to pivot 135A and to dynamic element 131A attached to dynamic part 95 and determines trajectory 140A thereof.

On the basis of FIG. 3A, the following calculations and considerations are presented to illustrate the design principles of impact handling system 100. The following calculations serve illustration purposes and are hence simplified. Specifically, the illustrative calculations assume constantly horizontal impact 80, no friction and applies a quasi-static calculation. Referring to dynamic part 95 alone, the quasi-static calculation assuming zero overall moment with respect to point R, $\Sigma M_R = 0$ implies $F \cdot (c - a \cdot \sin(\alpha)) = P \cdot b \cdot \sin(\beta)$ according to dimension annotation of lengths and angles appearing in FIG. 3A (F being impact 80 and P being the force applied at connection 130A). Defining A as $P/F = (c - a \cdot \sin(\alpha))/b \cdot \sin(\beta)$, and assuming zero overall moment with respect to point J (135), $\Sigma M_J = 0$ implies $F \cdot [c - a \cdot \sin(\alpha) + d \cdot \cos(\theta)] = P \cdot 1 \cdot \sin(\delta) + S \cdot x \cdot \sin(\gamma)$ according to dimension annotation of lengths and angles appearing in FIG. 3A (S being the force applied by energy absorbing element 120 at connection 130). After substituting P for A·F, the following relation results: $S = F \cdot [c - a \cdot \sin(\alpha) + d \cdot \cos(\theta) - A \cdot 1 \cdot \sin(\delta)]/[x \cdot \sin(\gamma)]$. This relation allows effecting α, θ and β by controlling the other angles and lengths in impact handling system 100, to essentially increase inclination angle ε of dynamic part 95 upon impact 80 (e.g. from ca. 25° to ca. 40° upon maximal impact).

FIGS. 3B and 3C schematically illustrate additional configurations of static element(s) 133, 133A and dynamic elements 131 and 131A in impact handling system 100 and particularly additional embodiments of controlling trajectories 140, 140A of dynamic elements 131, 131A in a way that converts at least a part of a horizontal component of impact 80 into a vertical force component applied to dynamic part 95. Dynamic elements 131 and 131A may be implemented in any of the disclosed embodiments illustrated in FIG. 3A as well as FIGS. 1A-1E, FIGS. 2A-2E and FIGS. 5A-5C below.

In certain embodiments, static element(s) 133, 133A may be at least one track 133, 133A shaped to determine trajectory 140, 140A of dynamic element 131, 131A, respectively, and possibly also convert at least a part of the horizontal component of impact 80 into a vertical force component applied to dynamic part 95 to increase its inclination angle ε. Alternatively or additionally, the conversion may be carried out by the angular positioning of energy absorbing element(s) 120. FIG. 3C illustrates energy absorbing element(s) 120 attached directly to dynamic element 131, 131A, which simultaneously restrain dynamic element 131, 131A and attached dynamic part 95, and control respective trajectories 140, 140A thereof to increase its inclination angle ε. Tracks 133, 133A may comprise, e.g., groove(s), ridge(s) or cam(s), to guide dynamic elements 131, 131A, respectively.

Connections 130, 130A may be configured as a wide range of mechanical connections, including a mechanical linkage (e.g., a n-bar linkage), a linear connection limited to allowing linear motion, a cam arrangement, and angular arrangement etc., and any other arrangement, taught e.g., in WIPO Publication No. 2013046200. For example, connections 130, 130A may comprise a slideway and a slide linearly displaceable along the slideway, with the linear displacement of the slide relative to the slideway controlled by the deformable element interconnecting the slideway and slide. The slideway may comprise two orthogonal rails configured for sliding the slide in two orthogonal directions. The slideway may comprise a plurality of rails configured for sliding the slide in a plurality of directions angularly different from each other. Connections 130, 130A may comprise a turning arrangement configured for a smooth rotation of the displaceable member. Connections 130, 130A may comprise a six-bar-hinged sub-arrangement configured for controllable linear displacement, having a sub-arrangement with an axis of symmetry passing through two opposite hinges, and with energy absorbing element(s) 120 connecting the opposite hinges.

In certain embodiments (not shown), at least one of dynamic elements 131, 131A may be a pivoted cam, configured to control forces delivered to dynamic part 95 and its orientation according to similar principles. In certain embodiments, energy absorbing element(s) 120 may operate using various mechanical principles, and absorb some, most or all energy mechanically, by deformation or electromagnetically. Energy absorbing element(s) 120 may be produced by any of casting, injecting, eroding, molding, wire twining, machining, cutting, forming, bending and any combination thereof. Energy absorbing element(s) 120 may comprise any of: an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating a tube/strap/cable absorber, a tube flaring, a housed coiled cable absorber, a bar-through-die absorber, a hydraulic absorber, a pneumatic absorber and combinations thereof.

Figure 4:
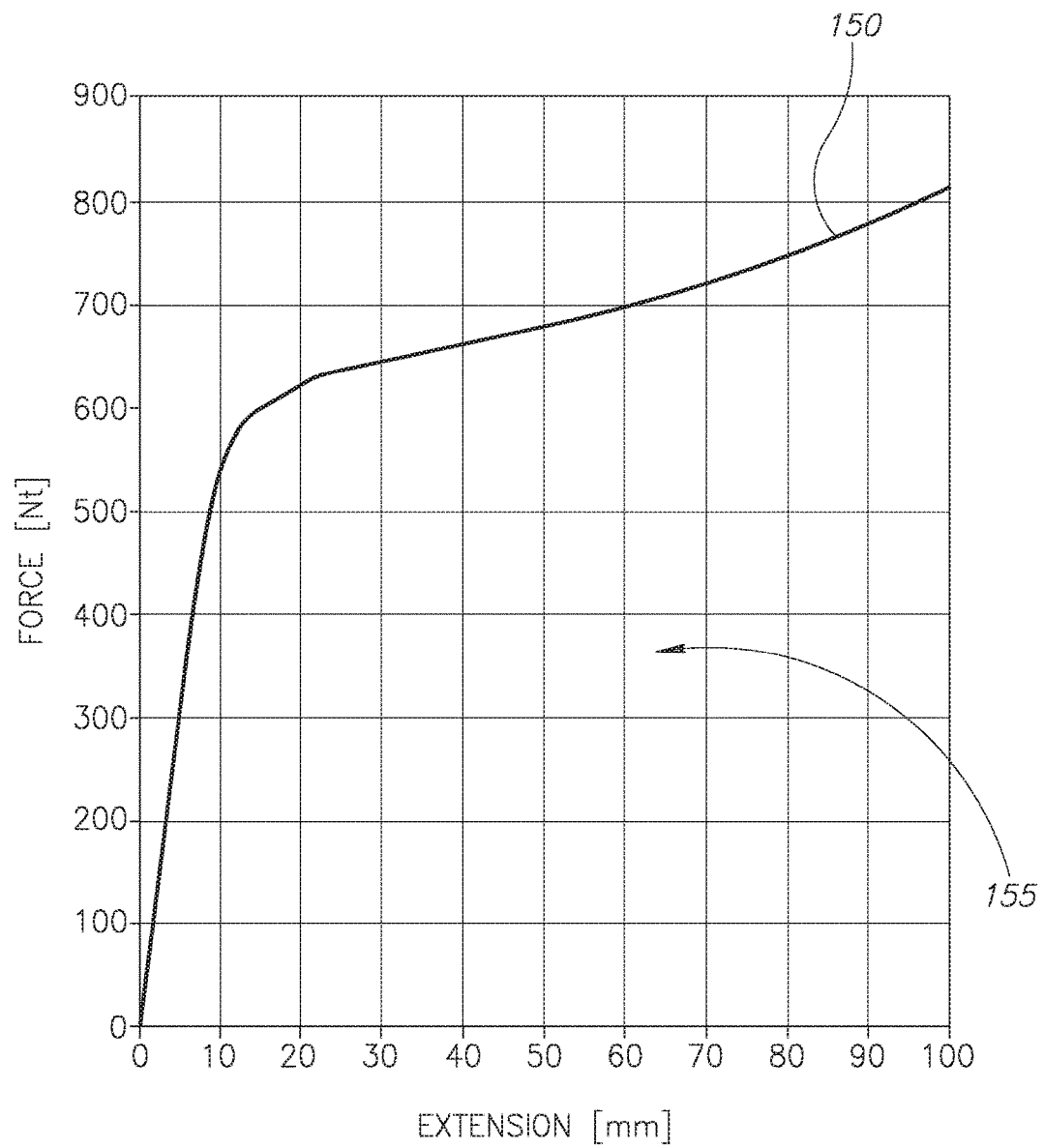
FIG. 4 is an example for an extension-force diagram that characterizes energy absorbing element(s), according to some embodiments of the invention.

FIG. 4 is an example for an extension-force diagram that characterizes energy absorbing element(s) 120, according to some embodiments of the invention. Curve 150, presenting the force applied by energy absorbing element 120 as a function of its extension (or displacement of its connection point to dynamic element 132) may be controlled and modified by configuring e.g., the dimensions of energy absorbing element(s) 120 such as length, width, thickness, form, type of cut and parameters of spiral windings, in case energy absorbing element(s) 120 are configured according to WIPO Publication No. 2013046200 (see below). Curve 150 denotes the force S applied by energy absorbing element(s) 120 onto connection 130 (see FIG. 3A) and configuring curve 150 enables control of the changes of the angles in impact handling system 100 upon varying impacts, as well control of strength requirements applicable to static part 90 and dynamic part 95. Furthermore, area 155 below curve 150 schematically illustrates the energy absorbed by energy absorbing element(s) 120 as it extends, and hence the reduction in impact energy. Specifically, either or both static part 90 and dynamic part 95 may be designed to take reduced forces and absorbed energy into account, to relief structural requirements thereupon.

Curve 150 may be modified according to the specific application scenarios, including number and positioning of energy absorbing element(s) 120, characteristics of person occupying the seat (e.g., grown up, child or baby) etc.

Curve 150 may also be adapted according to auxiliary energy absorption mechanisms which are involved, e.g., the positions and specifications of seat belts.

Figure 5A:
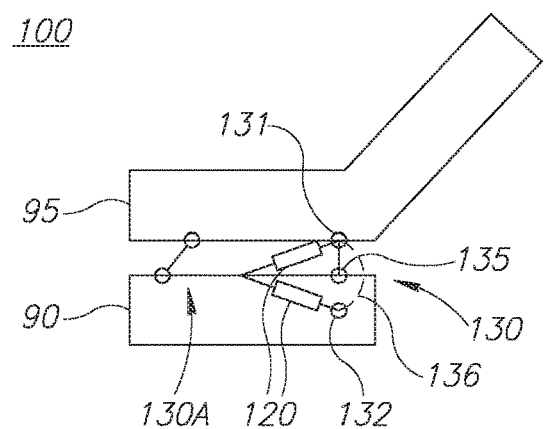
FIGS. 5A-5C schematically illustrate conceptual configurations of the impact handling system, according to some embodiments of the invention.
Figure 5B:
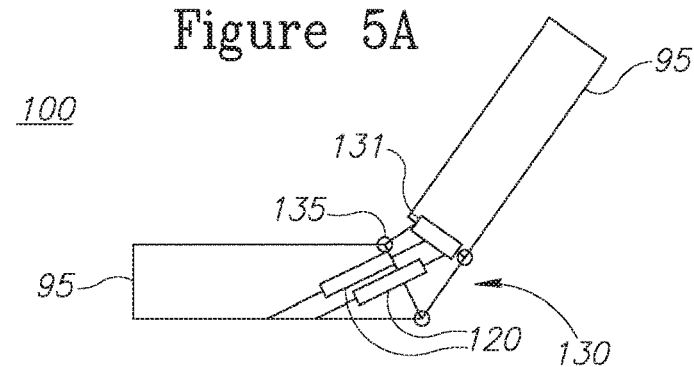
Figure 5C:
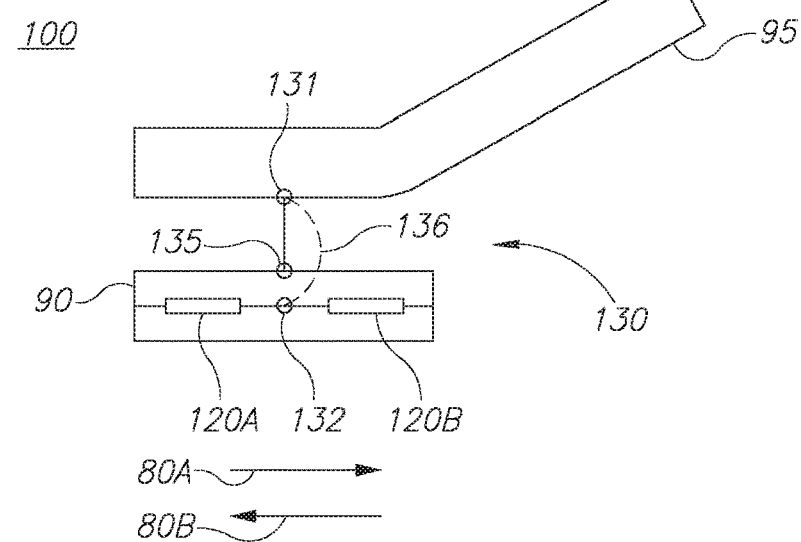

FIGS. 5A-5C are high level schematic illustrations of impact handling system 100 according to some embodiments of the invention. FIGS. 5A-5C schematically illustrates impact handling principles and a variety of schematic configurations, the details of which may be adapted to specific circumstances. FIGS. 5A-5C generalize the more specific yet non-limiting embodiments illustrated above.

Impact handling system 100 comprises dynamic part 95 mounted on static part 90 and at least one energy absorbing element 120 configured to restrain a movement of dynamic part 95 relative to static part 90 upon impact 80 (see FIG. 3A). System 100 further comprises at least one connection 130 between static and dynamic parts 90, 95 (respectively). Connection(s) 130 (and 130A) has static element(s) 135 attached to static part 90 and dynamic element(s) 131 (and 132) attached to dynamic part 95. Energy absorbing element(s) 120 (120A, 120B) is connecting static part 90 to dynamic element(s) 131 (and/or 132). Static element(s) 135 is configured to control a trajectory 140 (and 140A, see FIGS. 3A-3C) of dynamic element(s) 131 in a way that converts at least a part of a horizontal component of the impact into a vertical force component applied to dynamic part 95 (see FIG. 3A).

Dynamic part 95 may be a seat and static part 90 may be a basis (e.g., an ISOFIX basis) onto which the seat is mounted (as illustrated above, and see e.g., FIGS. 5A, 5C) or dynamic part 95 may be a seat back and static part 90 may be a seat base (see e.g., FIG. 5B).

Configuration of impact handling system 100 and specifically of connections 130, 130A may be carried out with respect to available free volumes around static and dynamic parts 90, 95, such as components of a seat system.

FIGS. 5A-5B schematically illustrate conceptual configurations, with dynamic element(s) 131 represented by a circle which is optionally connected by an extension 136 to other dynamic element(s) 132 (represented by another circle) at a different location. The relative positions of dynamic elements 131, 132 and the nature and form of extension 136 (which is denoted, very schematically, by a broken line) may be configured to control trajectories 140 of dynamic elements 131, 132 and therefor dynamic part 95 as well as to convert at least part of an horizontal component of the impact into a vertical force component acting on dynamic part 95 and causing e.g., a change of the angle of dynamic part 95 in order to accommodate the forces acting on a person sitting in the seat to be absorbed better by the person's body.

As shown above, FIG. 3A schematically illustrates impact handling system 100 having two sets of connections 130, 130A. In one set of connections (130) static element(s) 135 comprises pivot(s) 135 and dynamic element(s) comprises arms 138, 139 hingedly connected to pivot(s) 135 to form a fixed specified angle. Arm 138 is further connected to energy absorbing element(s) 120 and arm 139 is further connected to dynamic element 131 attached to dynamic part 95 and determines trajectory 140 thereof. In certain embodiments, impact handling system 100 comprises multiple such sets. In certain embodiments, impact handling system 100 further comprises one or more different sets of connections (130A), in which static element 135 comprises respective pivot 135A and dynamic element 131 comprises one arm 137 hingedly connected to pivot 135A and to dynamic element 131A attached to dynamic part 95 and determines trajectory 140A thereof. FIG. 5A schematically illustrates embodiments designed according to this principle in an abstract manner, showing extension 136 as representing arms 138, 139. Clearly, extension 136 may be implemented in different ways, e.g., as a cam-like extension, as a multiple bar linkage, as a linear configuration (enabling linear and not angular motions) etc.

FIG. 5B schematically illustrates certain embodiments, in which impact handling system 100 connects seat base as static part 90 and seat back as dynamic part 95 and comprises one or more energy absorbing element(s) 120 configured to restrain a movement of dynamic part 95 relative to static part 90 upon impact 80. Connection(s) 130 has static element(s) 135 attached to static part 90 and dynamic element(s) 131 attached to dynamic part 95. Energy absorbing element(s) 120 is connecting static part 90 to dynamic element(s) 131. Static element(s) 135 is configured to control a trajectory of dynamic element(s) 131 and the spatial relation between static and dynamic parts 90, 95 during their relative movement due to the impact, in a way that converts at least a part of a horizontal component of the impact into a vertical force component applied to dynamic part 95.

FIG. 5C schematically illustrates certain embodiments, in which impact handling system 100 comprises two or more opposing energy absorbing elements 120A, 120B configured to restrain movements of dynamic part 95 relative to static part 90 upon impact in either of respective two opposite impact directions 80A, 80B, respectively. Similar to the embodiments described above, the connection of energy absorbing elements 120A, 120B to static part 90 and to dynamic element 131 (and/or 132) may be at one or more connection points, and the spatial configuration of energy absorbing elements 120A, 120B and of static and dynamic elements 135, 131, 132 as well as of extension 136 may be configured to control the trajectory and orientation of dynamic part 95, restrain its movement, reduce the applied forces and convert at least part of an horizontal component of the impact into a vertical force component acting on dynamic part 95 and causing e.g., a change of the angle of dynamic part 95 in order to accommodate the forces acting on a person sitting in the seat to be absorbed better by the person's body.

The present disclosure elaborates on, and introduces further developments with respect to the disclosure of WIPO Publication No. 2013046200 which teaches energy absorbing devices for carrying a passenger seat; the devices comprise a base fixed to a vehicle; a member displaceable from base; at least one energy-absorbing arrangement interconnecting base and displaceable member. The energy-absorbing arrangement comprises a plastically deformable absorbing element in response to stresses greater than a predetermined threshold stress. In some embodiments the plastically deformable absorbing element is a helically configured ribbon having spaced-apart ribbon laps. In other embodiments the plastically deformable absorbing element is compressible, and/or extendable. A method of attenuating the acceleration applied to a passenger due to impact is disclosed; the method comprises steps of: providing an energy absorbing device fixedly attaching the base to the vehicle; fixedly attaching the passenger seat to the base; accidently applying the impact to the vehicle; displacing the displaceable member relative to the base; attenuating the effect of the impact on the passenger. Hence, WIPO Publication No. 2013046200 is incorporated herein by reference in its entirety. Any of the presently disclosed principles may be applied to develop and enhance any of the embodiments taught by WIPO Publication No. 2013046200. Such developments and enhancements are likewise considered part of the resent disclosure.

Furthermore, energy absorbing elements 120 may comprise any embodiment of the plastically deformable absorbing element which is a helically configured ribbon having spaced-apart ribbon laps, as described in WIPO Publication No. 2013046200. Energy absorbing elements 120 may comprise any other type of energy absorbing element, e.g., ones converting impact energy mechanically (e.g., plastically and/or elastically and in any deformation direction of the element), magnetically, electrically etc. and any combination thereof. Any configuration of the plastically deformable absorbing elements taught in WIPO Publication No. 2013046200 may be modified or enhanced according to the presently disclosed principles and embodiments. Furthermore, any form of connection 130 between energy absorbing elements 120 and dynamic part 95 (such as the seat of WIPO Publication No. 2013046200) may be adapted from and modified with respect to WIPO Publication No. 2013046200. For example, connections 130 may be constructed by enhancing any of the mechanisms taught in FIGS. 12-39 and the associated description of WIPO Publication No. 2013046200 according to the principles disclosed in the present invention, all such modifications and enhancements are thus included in the present disclosure.

Advantageously, the energy absorption requirement for the safety seat system may be split between the seat, base and the absorbing elements, relaxing the energy absorption requirement for the seat and/or the base. Thus, using energy absorbing elements 120 may allow producing lighter seats, which nevertheless satisfy the safety requirements when used with energy absorbing elements 120. Furthermore, the seat and base may be reconfigured according to forces applied via absorbing elements 120 and thus improve the seat's responses to impacts, utilizing the fact that application of absorbing elements 120 also makes the directions of force application due to impact more predictable. Any seat and basis configuration that is designed and produced according to the disclosed principles is considered part of the present disclosure.

Figure 6:
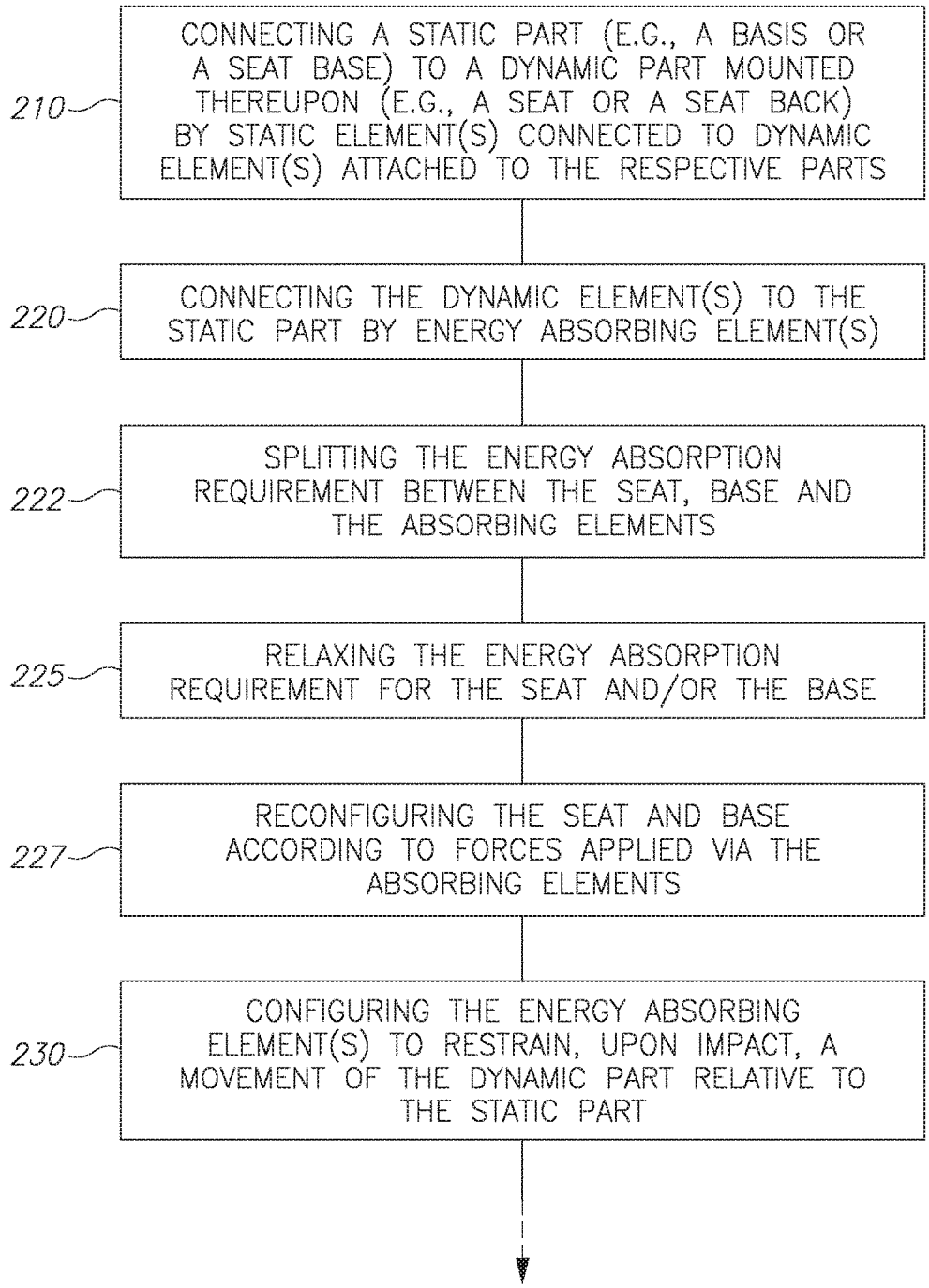
FIG. 6 is a high level schematic flowchart, schematically illustrating an impact handling method, according to some embodiments of the invention.

FIG. 6 is a high level schematic flowchart, schematically illustrating an impact handling method 200, according to some embodiments of the invention. Impact handling method 200 may comprise connecting a static part (e.g., a basis or a seat base) to a dynamic part mounted thereupon (e.g., a seat or a seat back) by at least one static element connected to at least one dynamic element attached to the respective parts (stage 210), connecting the at least one dynamic element to the static part by at least one energy absorbing element (stage 220), configuring the energy absorbing element(s) to restrain, upon impact, a movement of the dynamic part relative to the static part (stage 230) and configuring the static element(s) to control a trajectory of the dynamic element(s) in a way that converts at least a part of a horizontal component of the impact into a vertical force component applied to the dynamic part (stage 240).

In certain embodiments, method 200 may further comprise splitting the energy absorption requirement between the seat, base and the absorbing elements (stage 222), relaxing the energy absorption requirement for the seat and/or the base (stage 225) and reconfiguring the seat and base according to forces applied via the absorbing elements (stage 227).

In certain embodiments, method 200 may further comprise: controlling the seat's trajectory to make the sitting posture more upright upon impact (stage 245) and tilting the seat upon impact to a larger angle from the horizontal (stage 247).

Method 200 may further comprise configuring the static element(s) as track(s) shaped to determine the trajectory of the dynamic element(s) (stage 250), and possibly configuring the track(s) and/or the energy absorbing element(s) to at least partially carry out the force conversion (stage 255). Method 200 may further comprise configuring the dynamic element(s) as pivoted cam(s) (stage 260).

Method 200 may comprise configuring the static element(s) to comprise at least one pivot and the dynamic element(s) to comprise at least one pair of arms hingedly connected to the pivot(s) to form fixed specified angle(s) (stage 270). Method 200 may comprise connecting one arm of the pair(s) to the energy absorbing element(s) and another arm to the dynamic element(s) attached to the dynamic part to determine the trajectory thereof (stage 275).

Method 200 may comprise configuring the static element(s) to comprise respective at least one pivot and the dynamic element(s) to comprise at least one arm hingedly connected to the pivot(s) and to the dynamic element(s) attached to the dynamic part to determine the trajectory thereof (stage 280).

In certain embodiments, method 200 may comprise combining two-armed and one-armed configurations to control the trajectory and the force conversion (stage 285).

Method 200 may comprise connecting the dynamic element(s) to the static part by at least two energy absorbing elements configured to restrain a movement of the dynamic part relative to the static part upon impact in either of respective two opposite impact directions (stage 290).

In certain embodiments, dynamic part 95 may comprise a baby or child seat 95 or a vehicle seat 96, situated in a vehicle 60, as illustrated in the following FIG. 7. Embodiments comprise any combination of impact handling systems 100 and method 200 disclosed above, with alerting systems 160 and methods 300 disclosed below.

Figure 7:
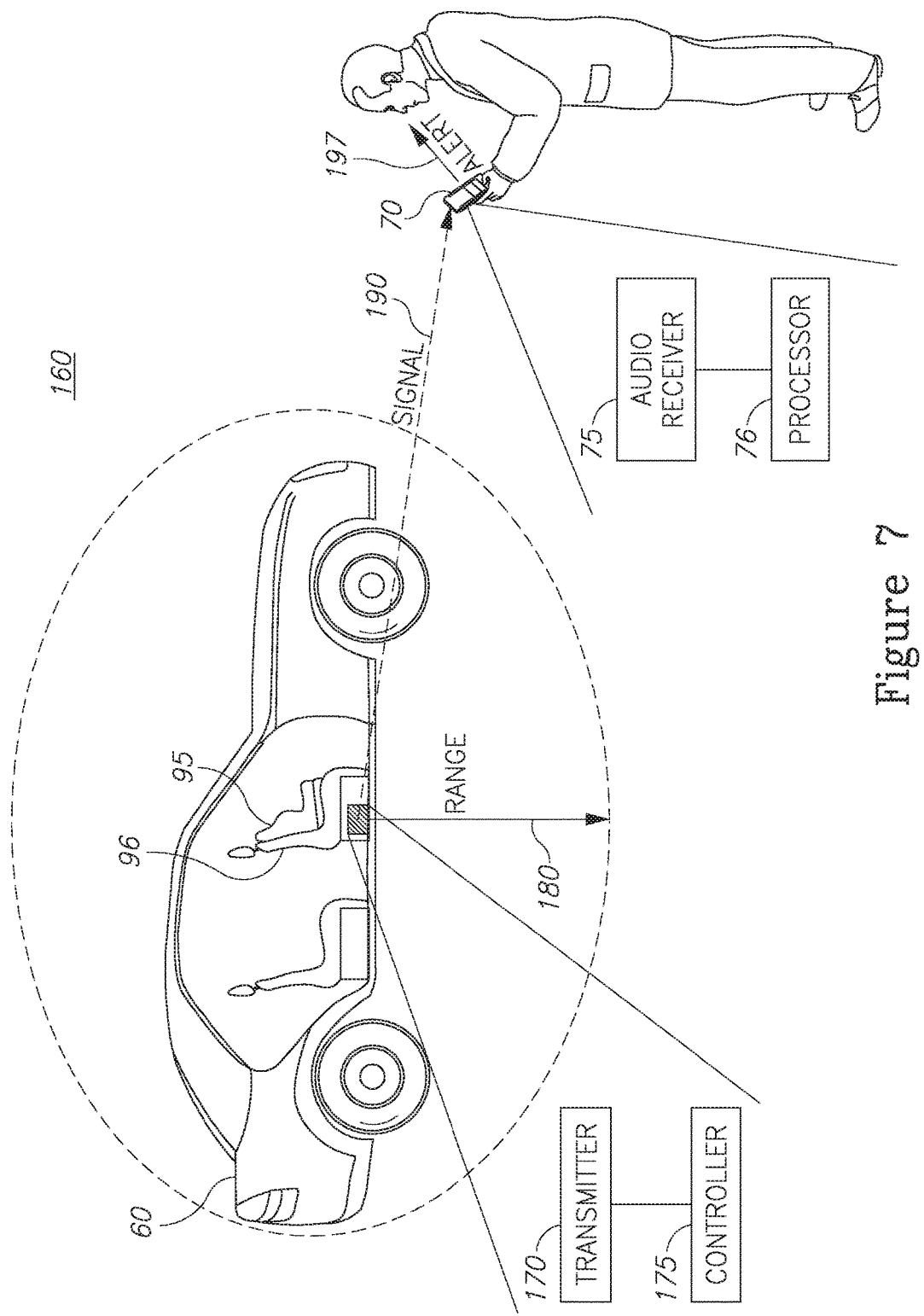
FIG. 7 is a high level schematic illustration of an alerting system, according to some embodiments of the invention.

FIG. 7 is a high level schematic illustration of an alerting system 160, according to some embodiments of the invention. FIG. 7 schematically illustrates non-limiting embodiments of system 160 operating in association with a baby seat 95 mounted on a vehicle seat 96 in a vehicle 60. The term "vehicle seat" as used herein refers to any seat within a vehicle, including both any type of baby or child seat 95 as well as adult vehicle seats 96. While a common purpose of certain embodiments is generating alerts in case of forgotten babies in vehicle 60, or seats 95 attached or operated incorrectly, certain embodiments may comprise generating alerts in other cases, relating to adults using vehicle seats 96.

In certain embodiments, alerting system 160 may comprise a transmitter 170 configured to transmit at least one ultrasound or near-ultrasound signal 190 at at least one specified frequency, and an audio receiver 75 configured to receive at least one ultrasound or near-ultrasound signal 190 and provide an indication of the signal reception. At least one ultrasound or near-ultrasound signal 190 may be associated with at least one seat status of seat 95 and/or 96 in vehicle 60. Audio receiver 75 may be further configured to indicate the at least one seat status associated with the received at least one ultrasound or near-ultrasound signal. The indication may be e.g., an audio signal, an optical signal, a control signal (e.g., to a user's device, to vehicle control elements such as locking control etc.) and/or a communication signal (e.g., to a user's device or to the user via vehicle-related indication elements such as lights or alarm). Audio receiver 75 may simply indicate the reception of signal 190, with transmitter 170 being attached to the person sitting in the seat (e.g., a baby) and/or associated with the respective seat belt. Audio receiver 75 may indicate failure to receive signal 190, type of signal 190 or any other signal related property.

Alerting system 160 may comprise transmitter 170 configured to transmit at least one ultrasound or near-ultrasound signal 190 at at least one specified frequency, and a controller 175 associated with vehicle seat 95 and/or 96 and configured to generate ultrasound or near-ultrasound signal(s) 190 with respect to at least one seat status and control transmitter 170 accordingly.

Alerting system 160 further comprises an application (e.g., run by a processor 76) installable on a user's communication device 70 to be associated with a device's audio receiver 75 or with a standalone audio receiver 75. The application is configured to detect at least one ultrasound or near-ultrasound signal 190 and generate at least one alert 197 associated with a failure to detect at least one ultrasound or near-ultrasound signal 190.

Configurations of system 160 may comprise transmitter 170 and/or controller 175 associated or embedded in baby seat 95 and/or in vehicle seat 96. Configurations of system 160 may comprise audio receiver 75 and/or processor 76 associated or embedded in user's communication device 70 and/or be produced as independent unit(s). In certain embodiments, audio receiver 75 may be associated with vehicle 60 and processor 76 may be configured to generate alarm 197 according to a relation between the seat status(es) and the vehicle's state. For example, if signal 190 indicates a baby is still in seat 95 and vehicle 60 is not running for a specified duration, system 160 may generate respective alarm 197 at vehicle 60 and/or at user's device 70.

In certain embodiments, controller 175 may be associated with any one of: a weight sensor, a belt sensor, a mechanical sensor and an electromagnetic sensor, any of which being configured to indicate respective seat statuses such as a connection status of a seat belt, a connection status of baby seat 95 to vehicle 60 (e.g., via vehicle seat 96), a seat occupancy status and any other status indication relating to seats 95, 96. Ultrasound or near-ultrasound signal(s) 190 may be modulated to indicate any of a plurality of seat statuses such as the disclosed examples. For example, signal 190 may comprise a sequence of discrete signal elements (e.g., pulses), wherein any or both of the sequence and its elements may be modified to indicate the seat statuses, e.g., in a Morse-code-like fashion or according to any scheme that associates seat statuses with signal modulation patterns.

Figure 8:
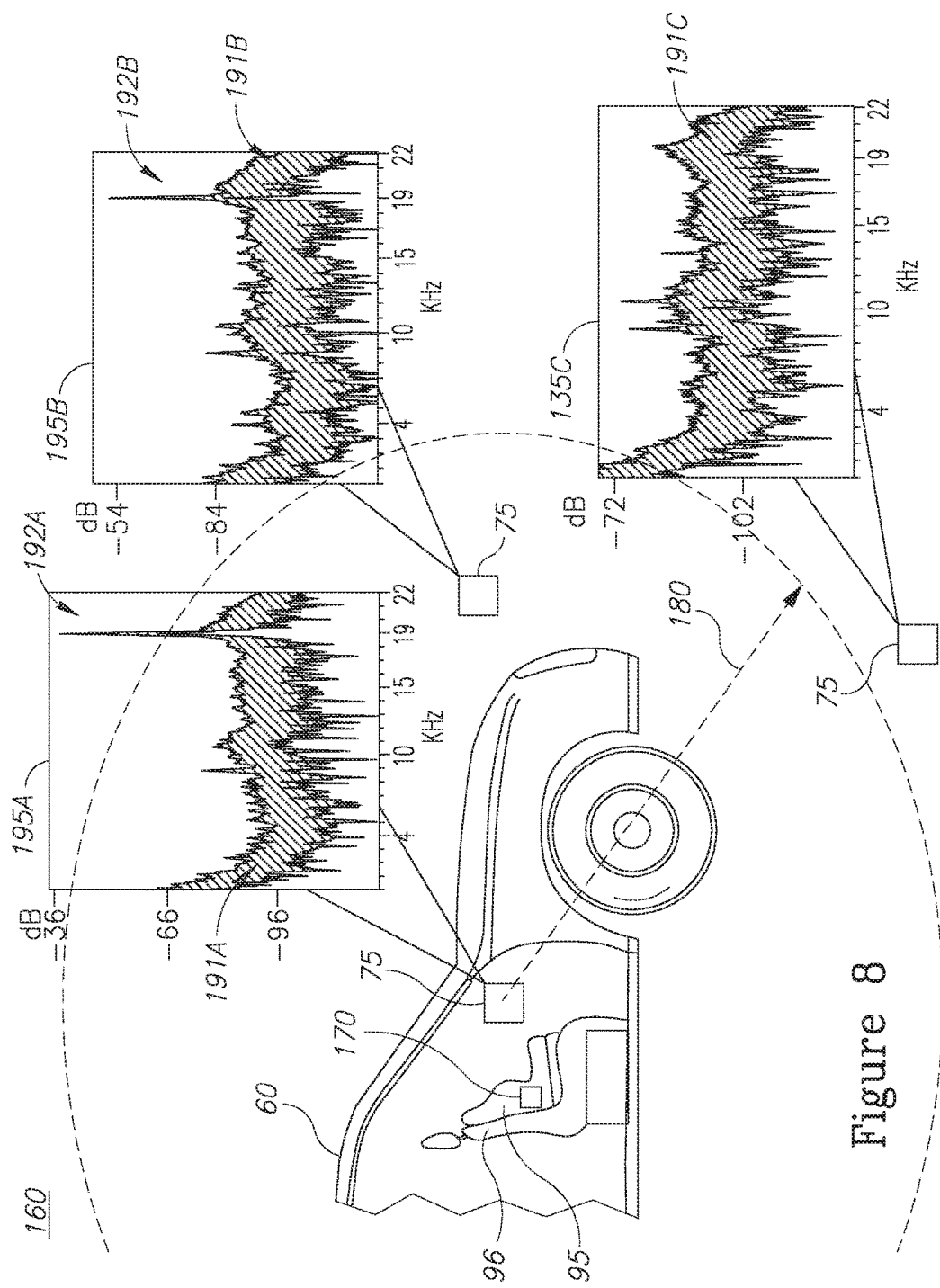
FIG. 8 is a high level schematic illustration of near-ultrasound signal detection at different distances, according to some embodiments of the invention.

FIG. 8 is a high level schematic illustration of near-ultrasound signal detection at different distances, according to some embodiments of the invention. In certain embodiments, a transmission intensity of transmitter 170 may be configured to be detectable by audio receiver 75 up to a specified range 180, in non-limiting examples, up to 10 meters. For example, a signal to noise ratio may be designed to fade away signal 190 in the surrounding noise beyond range 180. Alternatively or complementarily, the transmission intensity may be configured to be detectable only within vehicle 60, and/or the transmission intensity may be configured to be undetectable outside vehicle 60 when the doors are shut.

FIG. 8 schematically illustrates displays 195A-C of received signals 190 with background noise at three different locations of receiver 75, as recorded in a demonstrative experiment. With receiver 75 within vehicle 60, displayed received signal 195A comprises a clear near-ultrasound signal 192A over background noise 191A. In the non-limiting illustrated example, near-ultrasound signals 190 were transmitted at ca. 19 kHz and noise level was lower than −66 dB while received signals in cases of detection were stronger than −66 dB, their strength depending on the distance between transmitter 170 and receiver 75 and vehicle status (e.g., doors open or closed). With receiver 75 outside vehicle 60 but within range 180, near-ultrasound signal 192B is still detectable in displayed received signal 195B over background noise 191B. However, outside range 180, no clear near-ultrasound signal is detectable above noise 191C in displayed received signal 195C. Such failure to detect near-ultrasound signal after former detection thereof is configured to set off alert 197. By configuring the transmission intensity, a distinction between a user being close or in vehicle 60 and a user moving away from vehicle 60 can be made, and used to create respective alerts. In certain embodiments, detection may be configured to depend ton vehicle status, e.g., whether vehicle doors are open or shut, whether vehicle 60 is locked, standing or moving etc. Delays may be introduced between signal detection, or detection failures, and the actual activation of alert 197, for example, a specified time period may be allowed between closing the vehicle doors and activation of alert 197.

In certain embodiments, different alerts 197 may be created for cases such as improper use (e.g., installation) of seat 95 and/or 96, e.g., incomplete connection (or connection status) of a belt, of an isofix connection between seats 95, 96 or of supporting elements such as a supporting leg or a back tether, and cases involving forgetting a baby, a child or a person in vehicle 60. Alerts 197 may take any form and/or multiple forms, such as a visual signal (e.g., blinking), a message (e.g., a text message or an on-screen message), an audio signal and a call, e.g., associated with user's communication device 70. In case that multiple alerts 197 are applicable, system 160 may be configured to prioritize alerts 197 and/or to generate a sequence of alerts 197 is a specified order, and possibly repeat the sequence. Sequence and alerts' durations may be configured as specified.

In certain embodiments, processor 76 may fuse data from audio receiver 75 and sensors associated with device 70 to create certain alerts 197. For example, alert 197 may be set off upon detection of a seat status such as unbuckled belt and present baby and detection of vehicle movement by the sensors of device 70.

The at least one specified frequency of ultrasound or near-ultrasound signal(s) 190 is selected to be receivable by audio receiver 75. Certain embodiments utilize the ability of audio receivers 75 such as microphones of communication devices 70 to actually sense audio frequencies much higher than the audible range. For example, ultrasound or near-ultrasound signal(s) 190 may be at frequencies between 18-24 kHz, between 24-44 kHz and/or around 22 kHz.

Advantageously, alerting system 160 overcomes the prevalent difficulties in electromagnetically-based alerting systems, such as systems operating with cellular communication channels, WiFi or Bluetooth in that it avoids compatibility issues, does not require a bidirectional channel, is much more reliable and uses significantly less energy, which enables more efficient implementation.

Figure 9:
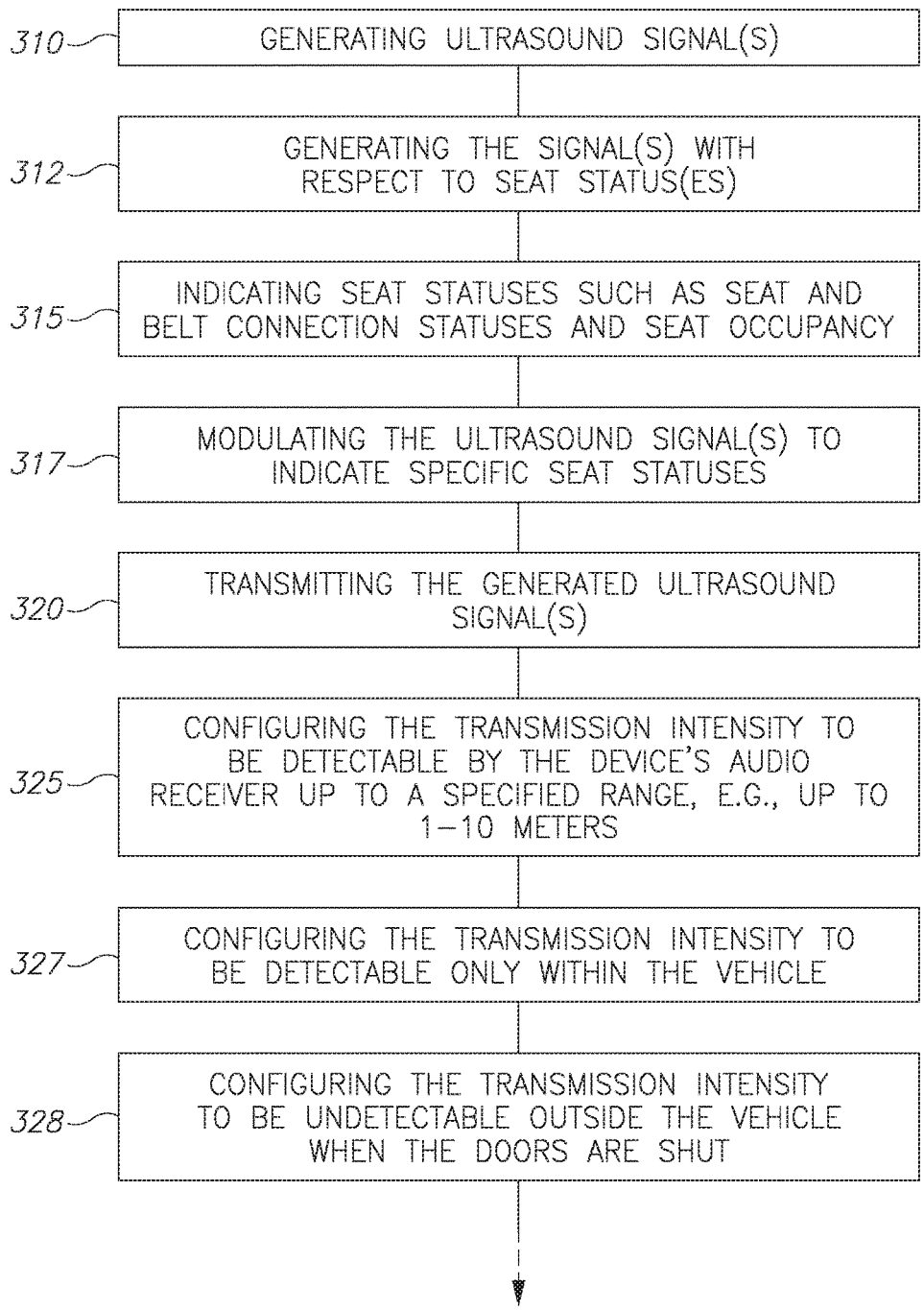
FIG. 9 is a high level schematic flowchart of an alerting method, according to some embodiments of the invention.

FIG. 9 is a high level schematic flowchart of an alerting method 300, according to some embodiments of the invention. Data processing stages of method 300 may be implemented by processor 76 and certain embodiments comprise respective processors, software components and algorithms configured to carry out at least part of the respective stages.

Alerting method 300 may comprise generating at least one ultrasound or near-ultrasound signal (stage 310), for example with respect to at least one seat status (stage 312), transmitting the generated at least one ultrasound or near-ultrasound signal at at least one specified frequency (stage 320), detecting, at an audio receiver of a user's communication device, the transmitted at least one ultrasound or near-ultrasound signal (stage 330), and indicating signal reception (stage 335) and/or generating at least one alert associated with a failure to detect the at least one ultrasound or near-ultrasound signal (stage 340). Method 300 may comprise indicating the seat status(es) (stage 345). Method 300 may further comprise selecting the at least one specified frequency to be receivable by the audio receiver.

In certain embodiments, the at least one seat status may comprise at least one of: a connection status of a seat belt, a connection status of the seat to the vehicle in case of the seat being a baby seat, and a seat occupancy status. Method 300 may further comprise modulating the at least one ultrasound or near-ultrasound signal (stage 317) to indicate any of the at least one seat status (stage 315) such as seat and belt connection statuses and seat occupancy.

In certain embodiments, method 300 further comprises configuring a transmission intensity to be detectable by the device's audio receiver up to a specified range up to ten meters (stage 325), in some embodiments. In certain embodiments, method 300 comprises configuring the transmission intensity to be detectable only within the vehicle (stage 327) and/or configuring the transmission intensity to be undetectable outside the vehicle when the doors are shut (stage 328).

In certain embodiments, method 300 may comprise indicating seat statuses with respect to vehicle statuses (stage 347).

Certain embodiments comprise a computer program product comprising a computer readable storage medium having computer readable program embodied therewith, the computer readable program configured to detect, at an audio receiver of a user's communication device, at least one ultrasound or near-ultrasound signal and generate at least one alert associated with a failure to detect the at least one ultrasound or near-ultrasound signal. The computer readable program may be further configured to generate, at a vehicle seat, the at least one ultrasound or near-ultrasound signal with respect to at least one seat status. The computer readable program may be further configured to modulate the at least one ultrasound or near-ultrasound signal to indicate at least one of: a connection status of a seat belt, a connection status of the seat to the vehicle in case of the seat being a baby seat, and a seat occupancy status.

In the above description, an embodiment is an example or implementation of the invention. The various appearances of "one embodiment", "an embodiment", "certain embodiments" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Certain embodiments of the invention may include features from different embodiments disclosed above, and certain embodiments may incorporate elements from other embodiments disclosed above. The disclosure of elements of the invention in the context of a specific embodiment is not to be taken as limiting their used in the specific embodiment alone.

Furthermore, it is to be understood that the invention can be carried out or practiced in various ways and that the invention can be implemented in certain embodiments other than the ones outlined in the description above.

The invention is not limited to those diagrams or to the corresponding descriptions. For example, flow need not move through each illustrated box or state, or in exactly the same order as illustrated and described.

Meanings of technical and scientific terms used herein are to be commonly understood as by one of ordinary skill in the art to which the invention belongs, unless otherwise defined.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. An alerting system comprising:
a transmitter having a transmission intensity and configured to transmit at least one ultrasound or near-ultrasound signal at at least one specified frequency, wherein the at least one ultrasound or near-ultrasound signal is associated with at least one baby seat status of a baby seat in a vehicle,
a controller associated with the baby seat and configured to generate the at least one ultrasound or near-ultrasound signal with respect to the at least one baby seat status and control the transmitter accordingly,
an audio receiver having a processor and configured to receive and detect the at least one ultrasound or near-ultrasound signal, provide an indication of the signal reception, indicate the at least one baby seat status associated with the received at least one ultrasound or near-ultrasound signal, and provide at least one corresponding alert,
wherein the at least one baby seat status comprises at least one of: improper installation of the baby seat, incomplete connection of a belt of the baby seat incomplete isofix connection of the baby seat, incomplete connection of supporting elements of the baby seat, and seat occupancy status of the baby seat,
wherein the at least one ultrasound or near-ultrasound signal comprises a sequence of discrete signal elements, wherein the sequence and the signal elements are modified to indicate any of the at least one baby seat status, and
wherein the transmission intensity of the transmitter is configured to be detectable by the audio receiver within a specified range of up to 10 meters, and wherein the audio receiver is further configured to indicate, when the audio receiver is outside the specified range, failure to receive the at least one ultrasound or near-ultrasound signal by the audio receiver to thereby provide a respective alert.

2. The alerting system of claim 1, wherein the at least one alert comprises at least one of: visual signal an on-screen message, a text message, an audio signal and a call, associated with a user's communication device.

3. The alerting system of claim 1, wherein the audio receiver and the processor are part of a user's communication device and the system further comprises an application, installable on the user's communication device, which is configured to mediate to the user the at least one baby seat status indication and the at least one corresponding alert.

4. The alerting system of claim 1, wherein the audio receiver and the processor are part of a standalone device arranged to generate the at least one alert.

5. The alerting system of claim 1, wherein the indication is provided as at least one of: an audio signal, an optical signal, a control signal and a communication signal.

6. The alerting system of claim 1, wherein the controller is associated with at least one of: a weight sensor, a belt sensor, a mechanical sensor and an electromagnetic sensor, the respective sensor configured to indicate the at least one baby seat status.

7. The alerting system of claim 1, wherein the at least one specified frequency is at least one of: between 18-24 kHz, between 24-44 kHz and 22 kHz.

8. An alerting method comprising:
generating, by a controller, at least one ultrasound or near-ultrasound signal for transmission with respect to at least one baby seat status of a baby seat, wherein the at least one baby seat status comprises at least one of: improper installation of the baby seat, incomplete connection of a belt of the baby seat, incomplete isofix connection of the baby seat, incomplete connection of supporting elements of the baby seat and seat, occupancy status of the baby seat,
configuring the at least one ultrasound or near-ultrasound signal to comprise a sequence of discrete signal elements, wherein the sequence and the signal elements are modified to indicate any of the at least one baby seat status;
transmitting, by a transmitter, in association with the baby seat in a vehicle, the at least one ultrasound or near-ultrasound signal,
detecting, by an audio receiver, the transmitted at least one ultrasound or near-ultrasound signal,
indicating, by the audio receiver, the detection of the at least one ultrasound or near-ultrasound signal with respect to the at least one baby seat status,
configuring a transmission intensity of the transmitter to be detectable within a specified range of up to 10 meters; and
indicating, by the audio receiver, when the audio receiver is outside the specified range, failure to receive the at least one ultrasound or near-ultrasound signal by the audio receiver to thereby provide a respective alert.

9. The alerting method of claim 8, wherein the detection is carried out at an audio receiver of a user's communication device.

10. The alerting method of claim 8, wherein the transmission and the detection are carried out at at least one specified frequency.

11. An alerting system comprising:
a transmitter having a transmission intensity and configured to transmit at least one ultrasound or near-ultrasound signal at a specified frequency, wherein the at least one ultrasound or near-ultrasound signal is associated with at least one baby seat status of a baby seat in a vehicle, and wherein the transmission intensity of the transmitter is configured to be detectable within a specified range of up to 10 meters,
a controller associated with the baby seat and configured to generate the at least one ultrasound or near-ultrasound signal with respect to the at least one baby seat status and control the transmitter accordingly,
an audio receiver having a processor configured to indicate, when the audio receiver is outside the specified range, failure to receive the at least one ultrasound or near-ultrasound signal by the audio receiver to thereby provide a respective alert,
wherein the at least one baby seat status comprises at least one of complete connection of a belt of the baby seat and seat occupancy status of the baby seat, and
wherein the at least one ultrasound or near-ultrasound signal comprises a sequence of discrete signal elements, wherein the sequence and the signal elements are modified to indicate any of the at least one baby seat status.

12. The alerting system of claim 11, wherein the respective alert comprises at least one of: visual signal, an on-screen message, a text message, an audio signal and a call, associated with a user's communication device.

13. The alerting system of claim 11, wherein the audio receiver and the processor are part of a user's communication device and the system further comprises an application installable on the user's communication device, which is configured to mediate to the user the at least one baby seat status indication and the respective alert.

14. The alerting system of claim 11, wherein the audio receiver and the processor are part of a standalone device arranged to generate the respective alert.

15. The alerting system of claim 11, wherein the indication is provided as at least one of: an audio signal, an optical signal, a control signal and a communication signal.

* * * * *